United States Patent
Fukui et al.

(10) Patent No.: US 10,544,762 B2
(45) Date of Patent: Jan. 28, 2020

(54) FUEL SUPPLY DEVICE

(71) Applicant: AISAN KOGYO KABUSHIKI KAISHA, Obu-shi, Aichi-ken (JP)

(72) Inventors: Tatsuki Fukui, Novi, MI (US); Koji Yoshida, Kasugai (JP); Akira Iida, Tokai (JP); Shinya Higashi, Kasugai (JP); Morihiro Takemura, Nisshin (JP); Hiroyasu Kariya, Kariya (JP); Takeaki Morizono, Tsushima (JP); Takuhito Fujiwara, Obu (JP); Kensuke Niwa, Nagoya (JP); Takehiro Yamauchi, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 36 days.

(21) Appl. No.: 16/071,571

(22) PCT Filed: Jan. 4, 2017

(86) PCT No.: PCT/JP2017/000042
§ 371 (c)(1),
(2) Date: Jul. 20, 2018

(87) PCT Pub. No.: WO2017/126316
PCT Pub. Date: Jul. 27, 2017

(65) Prior Publication Data
US 2019/0024617 A1 Jan. 24, 2019

(30) Foreign Application Priority Data
Jan. 21, 2016 (JP) .................. 2016-009524

(51) Int. Cl.
*F02M 37/10* (2006.01)
*B60K 15/03* (2006.01)

(52) U.S. Cl.
CPC .......... *F02M 37/103* (2013.01); *F02M 37/10* (2013.01); *F02M 37/106* (2013.01); *B60K 2015/03243* (2013.01)

(58) Field of Classification Search
CPC ..... F02M 37/103; F02M 37/106; F02M 37/10
See application file for complete search history.

(56) References Cited

U.S. PATENT DOCUMENTS 4,945,884 A * 8/1990 Coha .................... F02M 37/103
123/509
4,972,875 A * 11/1990 Beer .................. F02M 37/0017
123/514

(Continued)

FOREIGN PATENT DOCUMENTS

CN 201187333 Y 1/2009
JP H0333218 U 4/1991

(Continued)

OTHER PUBLICATIONS

PCT/JP2017/000042 International Search Report and Written Opinion dated Apr. 11, 2017 (9 p.).

(Continued)

*Primary Examiner* — Thomas N Moulis
(74) *Attorney, Agent, or Firm* — Conley Rose, P.C.

(57) ABSTRACT

A fuel supply device includes a flange unit configured to be attached to an upper wall of a fuel tank to close an opening of the fuel tank, a pump unit configured to be disposed within the fuel tank, and a coupling mechanism moveably coupling the pump unit to the flange unit in a vertically slidable manner. The coupling mechanism includes a fixed-side rail member having a rail portion extending vertically from the flange unit, and a movable-side rail member having a channel-groove shaped rail groove extending from the pump unit. The channel-groove shaped rail groove is slidably engaged with the rail portion of the fixed-side rail (Continued)

member. A recess having a semi-circular cross section is formed at a corner of the rail groove of the movable-side rail member.

19 Claims, 8 Drawing Sheets

(56) References Cited

U.S. PATENT DOCUMENTS

| | | | |
|---|---|---|---|
| 5,281,029 A | 1/1994 | Morita | |
| 5,482,444 A * | 1/1996 | Coha | F02M 37/103 248/638 |
| 5,762,049 A * | 6/1998 | Jones | F02M 37/10 123/509 |
| 5,788,094 A | 8/1998 | Kim et al. | |
| 9,539,893 B2 * | 1/2017 | Hsu | B60K 15/03 |
| 2003/0188722 A1 * | 10/2003 | Oku | B01D 35/0273 123/509 |
| 2003/0188786 A1 * | 10/2003 | Toki | B01D 35/0273 137/565.34 |
| 2004/0163630 A1 * | 8/2004 | Powell | F02M 37/025 123/509 |
| 2005/0166974 A1 * | 8/2005 | Hashiguchi | F02M 37/025 137/571 |
| 2005/0217733 A1 * | 10/2005 | Hayakawa | F02M 37/106 137/565.17 |
| 2008/0295808 A1 * | 12/2008 | Tateishi | B01D 35/027 123/497 |
| 2011/0011470 A1 * | 1/2011 | Tokunaga | B62J 35/00 137/565.17 |
| 2011/0168134 A1 * | 7/2011 | Lim | F02M 37/103 123/509 |
| 2015/0330341 A1 * | 11/2015 | Rossi | F02M 37/106 137/565.01 |
| 2016/0369756 A1 * | 12/2016 | Ikeya | F02M 37/0047 |
| 2017/0241386 A1 * | 8/2017 | Mason | F02M 37/0029 |
| 2017/0268470 A1 * | 9/2017 | Murakoshi | F02M 37/00 |
| 2018/0031408 A1 * | 2/2018 | Flynn | G01F 23/30 |
| 2019/0211785 A1 * | 7/2019 | Akiba | F02M 37/00 |

FOREIGN PATENT DOCUMENTS

| | | |
|---|---|---|
| JP | H0560129 A | 3/1993 |
| JP | H09152267 A | 6/1997 |
| JP | H11344032 A | 12/1999 |
| JP | 2003328989 A | 11/2003 |
| JP | 2005061585 A | 3/2005 |
| JP | 2006288601 A | 10/2006 |
| JP | 2012127433 A | 7/2012 |
| JP | 2012184760 A | 9/2012 |

OTHER PUBLICATIONS

Chinese Office Action dated Nov. 5, 2019, for Chinese Application No. 201780007547.6 (6 pages).

English Summary of Chinese Office Action dated Nov. 5, 2019, for Chinese Application No. 201780007547.6 (3 pages).

\* cited by examiner

FUEL SUPPLY DEVICE

CROSS-REFERENCE TO RELATED APPLICATIONS

The present application is a 35 U.S.C. § 371 National Phase entry of, and claims priority to, PCT Application No. PCT/JP2017/000042, filed Jan. 4, 2017, which claims priority to Japanese Patent Application No. 2016-009524, filed Jan. 21, 2016, both of which are hereby incorporated herein by reference in their entireties for all purposes.

STATEMENT REGARDING FEDERALLY SPONSORED RESEARCH OR DEVELOPMENT

Not applicable.

BACKGROUND

The present disclosure relates to a fuel supply device for supplying fuel from a fuel tank on a vehicle to an internal combustion engine such as a vehicle engine.

Conventional fuel supply devices have been disclosed in, for example, Japanese Laid-Open Patent Publication No. 2012-184760. The fuel supply device includes a cover-side unit, a pump-side unit, and a coupling mechanism. The cover-side unit is configured to close an opening that is formed on an upper wall of a fuel tank of a vehicle or the like. The pump-side unit includes a fuel pump which may be disposed within the fuel tank. The coupling mechanism is configured to couple the pump-side unit to the cover-side unit in a slidable manner in the vertical direction.

Figure 9:
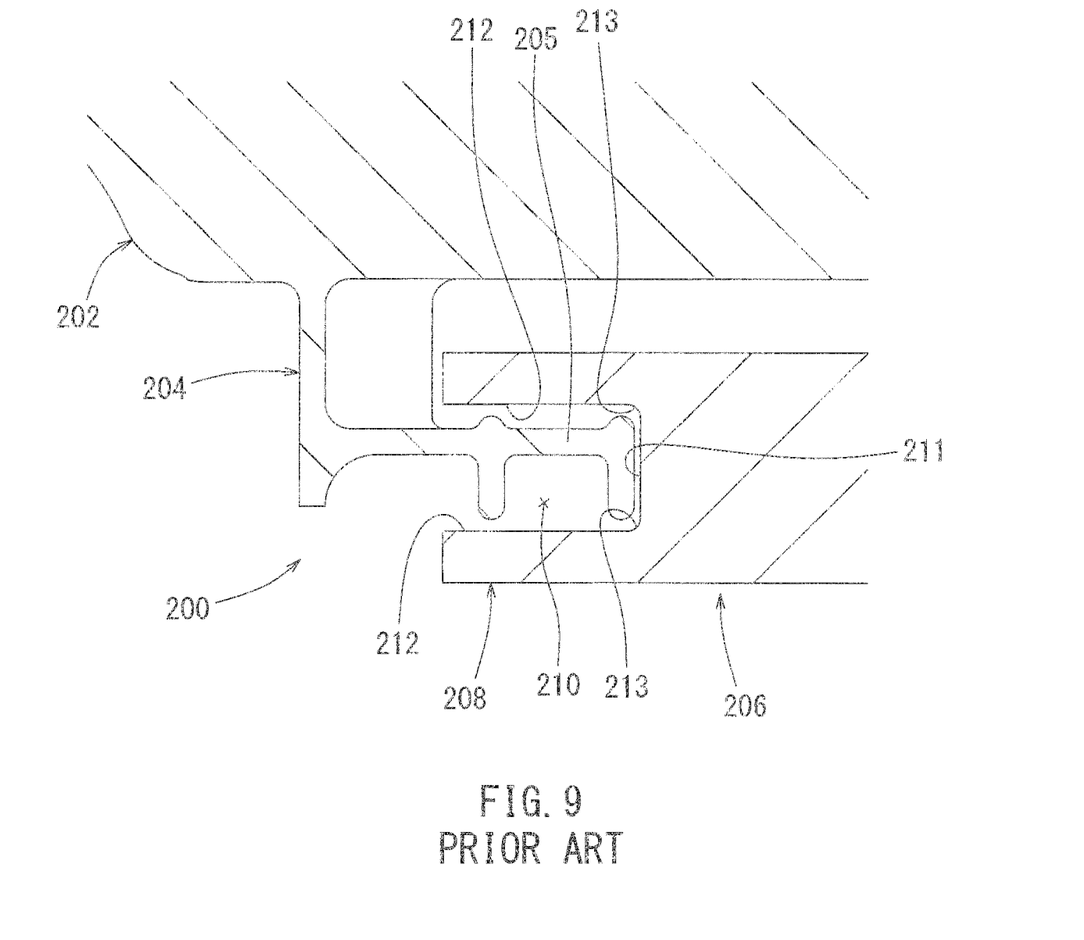
FIG. 9 is a cross-sectional view of a part of a coupling mechanism according to a conventional example known in the prior art.

As shown in FIG. 9, the coupling mechanism 200 includes a fixed-side rail member 204 provided as part of the cover-side unit 202 and a movable-side rail member 208 provided as part of the pump-side unit 206. The fixed-side rail member 204 includes a rail portion 205 linearly extending in the vertical direction (going into and out of the page of FIG. 9). The movable-side rail member 208 has a rail groove 210 that assumes the shape of a channel groove so as to slidably engage with the rail portion 205 of the fixed-side rail member 204. The rail groove 210 is formed with an inner end face 211 and a pair of groove lateral faces 212. Round chamfered portions 213 are formed at the intersection of both corners defined by the ends of inner end face 211 and both groove lateral faces 212.

Although, as shown in FIG. 9, both corners of the rail groove 210 of the movable-side rail 208 are formed with the chamfered portions 213, the curvature radius of each chamfered portion 213 is small. Therefore, if the vehicle is involved in a collision, the stress concentrations due to such a collision may disproportionately arise at the corners (chamfered portions 213) of the rail groove 210 of the movable-side rail member 208. As a result, damage such as a crack may form at the corners. In order to relieve the stress due to the collision, the curvature radius of the chamfered portions 213 may be increased. However, if the curvature radii of the chamfered portions 213 are increased, the chamfered portions 213 may interfere with the leading end (right end in FIG. 9) of the rail portion 205 of the fixed-side rail member 204. Therefore, it is difficult to increase the curvature radii of the chamfered portions 213. Accordingly, there is a need for a fuel supply device that reduces stress concentrations at the corners of a rail groove of a movable-side rail member while simultaneously avoiding interference with a rail portion of a fixed-side rail member.

BRIEF SUMMARY

According to one aspect of the present disclosure, a fuel supply device may comprise a cover-side unit configured to close an opening formed on an upper wall of a fuel tank of a vehicle, a pump-side unit having a fuel pump that may be disposed within the fuel tank, and a coupling mechanism configured to couple the pump-side unit to the cover-side unit in a vertically slidable manner. The coupling mechanism may include a fixed-side rail member (or members) having a rail portion (or portions) that is provided as part of the cover-side unit and extends in a vertical direction, and a movable-side rail member (or members) that is provided as part of the pump-side unit and has a rail groove (or grooves) configured in a channel groove shape that can slidably engage with the rail portion of the fixed-side rail member. A recess (or recesses) with a semi-circular cross section is formed at a corner (or corners) of the rail groove (or grooves) of the movable-side rail member (or members) for relieving stress concentrations at the corner (or corners).

With this structural configuration, it is possible to relieve the concentration of the stress at the corner (or corners) of the rail groove of the movable-side rail member whenever the vehicle utilizing the fuel supply device is involved in a collision. The recess is formed at the corner (or corners) of the rail groove of the movable-side rail member. Therefore, being formed in such a manner, said recess may prevent the rail groove from interfering with the rail portion of the fixed-side rail member unlike the case in the prior art described above where curvature radiuses of chamfered portions at corners are increased. Accordingly, it is possible to relieve stress concentrations at the corner (or corners) of the rail groove of the movable-side rail member while avoiding the interference of said corner of the rail groove with the rail portion of the fixed-side rail member.

According to another aspect of the present disclosure, the rail groove (or grooves) of the movable-side rail member (or members) includes an inner end face (or faces) and two groove lateral faces. The recess (or recesses) may be formed at the inner end face (or faces) at the corner (corners) of the rail groove (grooves) and recessed in a direction laterally opposite the rail portion of the fixed-side rail member. This structural configuration of the recess (or recesses) can reduce and/or prevent stress concentrations at the corner (or corners) of the rail groove (or grooves) while maintaining the strength provided by both walls defined by the both groove lateral faces of the rail groove (or grooves).

According to another aspect of the present disclosure, a metallic slider (or sliders) capable of improving the sliding property between members, by decreasing friction when sliding against one another, is interposed between the rail portion (or portions) of the fixed-side rail member (or members) and the rail groove (or grooves) of the movable-side rail member (or members). Therefore, it is possible to reduce and/or prevent generation of abnormal noise caused by direct sliding contact of the both rail members.

According to another aspect of the present disclosure, a stopper (or stoppers) is formed at a lower end (or ends) of the rail groove (or grooves) of the movable-side rail member (or members), wherein the stopper (or stoppers) is configured to prevent excessive upward movement of the movable-side rail member (or members) with respect to the rail portion (or portions) of the fixed-side rail member (or members). With such a stopper being present, it is possible to reduce the likelihood of and/or prevent a possible malfunction that may occur as a result of the excessive upward movement of the pump-side unit if the fuel tank contracts in response to the variation of the internal pressure within the tank. In addition, with the structural configuration as described, it is possible to reduce and/or prevent the excessive contraction of the fuel tank in the upward and downward direction.

According to another aspect of the present disclosure, the stopper (or stoppers) may be formed with an inclined surface configured to prevent said stopper (or stoppers) from being caught by an edge of the opening formed in the upper wall of the tank. Therefore, when the pump-side unit is inserted into the fuel tank, the inclined surface may prevent the stopper from being caught on any such edge of the opening, and allow easier and smoother entry of the pump-side unit into the tank.

DETAILED DESCRIPTION

Hereinafter, one exemplary embodiment for carrying out the present invention will be described with reference to the drawings. A fuel supply device according to the present embodiment serves to supply fuel from within a fuel tank to an engine, wherein the fuel tank is mounted on a vehicle such as an automobile equipped with an engine, such as an internal combustion engine. Each indicated direction, such as the forward, rearward, leftward, rightward, upward and downward directions, as indicated in FIGS. 1 to 4, corresponds to a respective direction of the vehicle upon which the device may be fitted. In particular, the frontward/rearward directions correspond to the vehicle length direction, the leftward/rightward directions correspond to the vehicle width direction, and the upward/downward directions correspond to the vehicle height. The frontward/rearward directions and leftward/rightward directions of the fuel supply device may be oriented in any conceivable direction.

Figure 2:
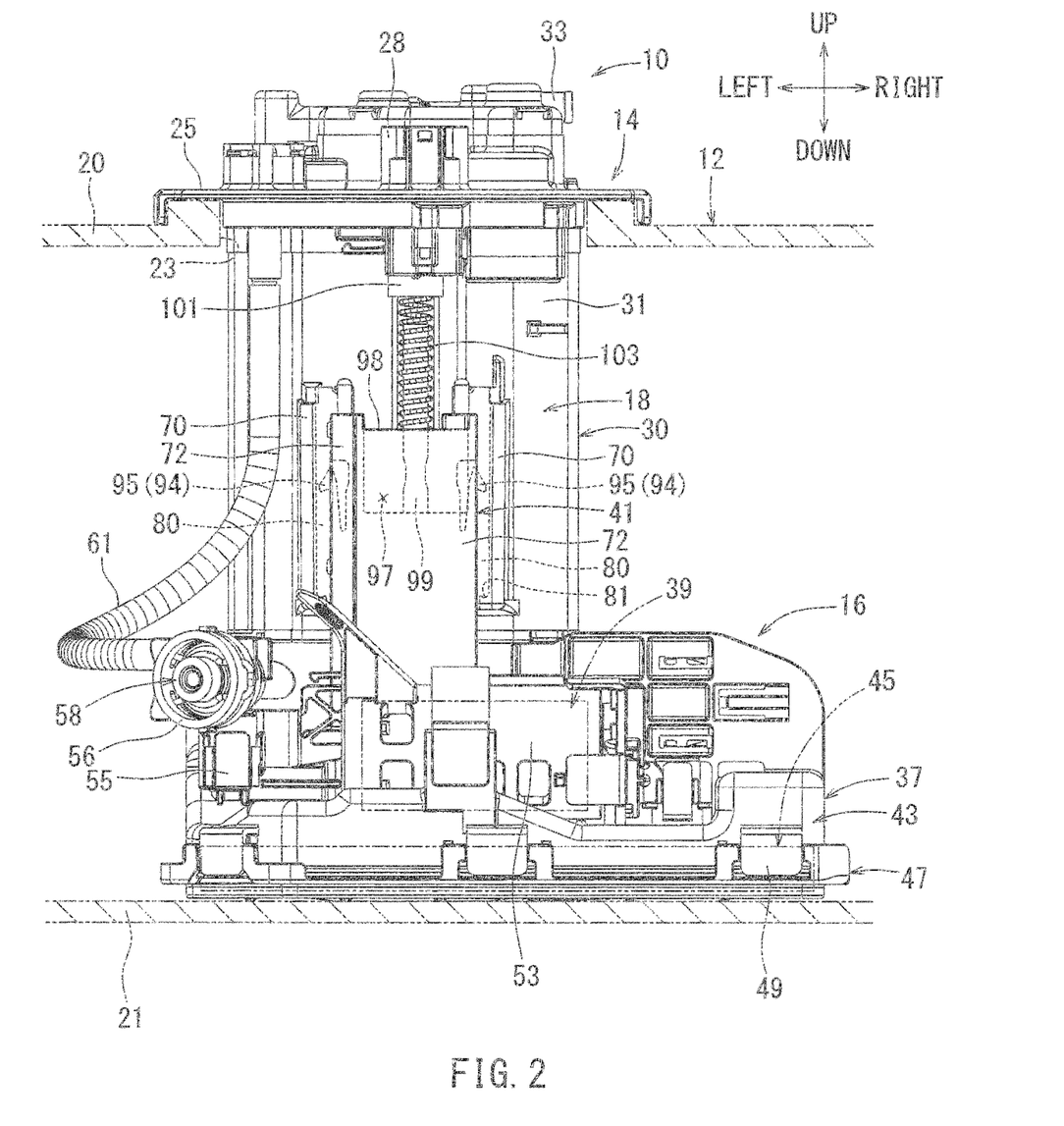
FIG. 2 is a front view of the fuel supply device.
Figure 3:
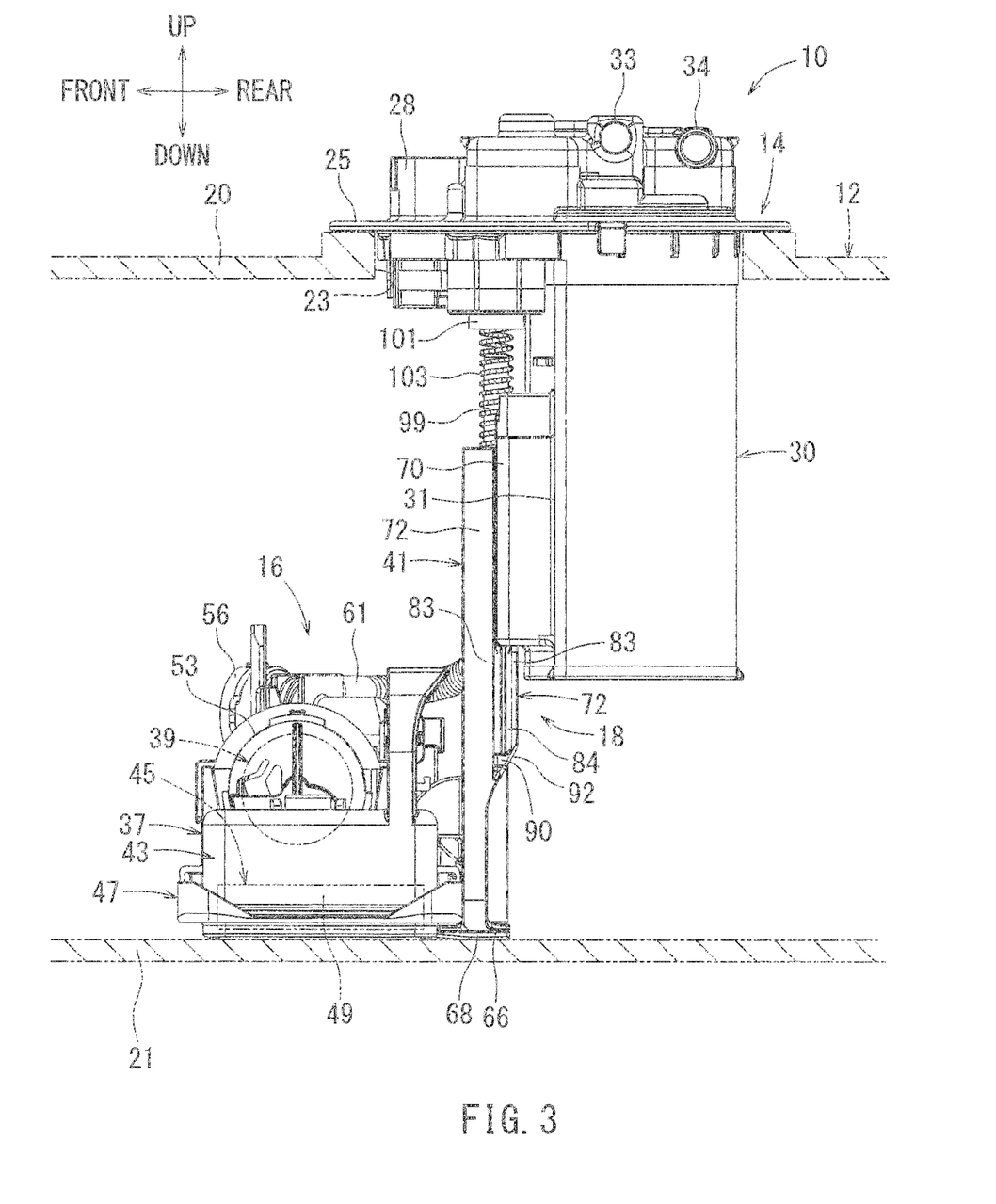
FIG. 3 is a side view of the fuel supply device.

As shown in FIGS. 2 and 3, the fuel supply device 10 is installed onto a fuel tank 12. The fuel supply device 10 includes a flange unit 14, a pump unit 16, and a coupling mechanism 18.

The fuel tank 12 is made of resin and is formed in the shape of a hollow container having an upper wall 20 and a bottom wall 21. A circular hole-like opening 23 is formed in the upper wall 20. The fuel tank 12 is designed to be fitted to a vehicle (not shown) with a horizontal upper wall 20 and bottom wall 21 (parallel to the left-to-right direction). Liquid fuel such as gasoline is stored in the fuel tank 12. The fuel tank 12 may be deformed (expanded or contracted mainly in the upward/downward direction) in response to variations of the internal pressure within the tank.

Figure 1:
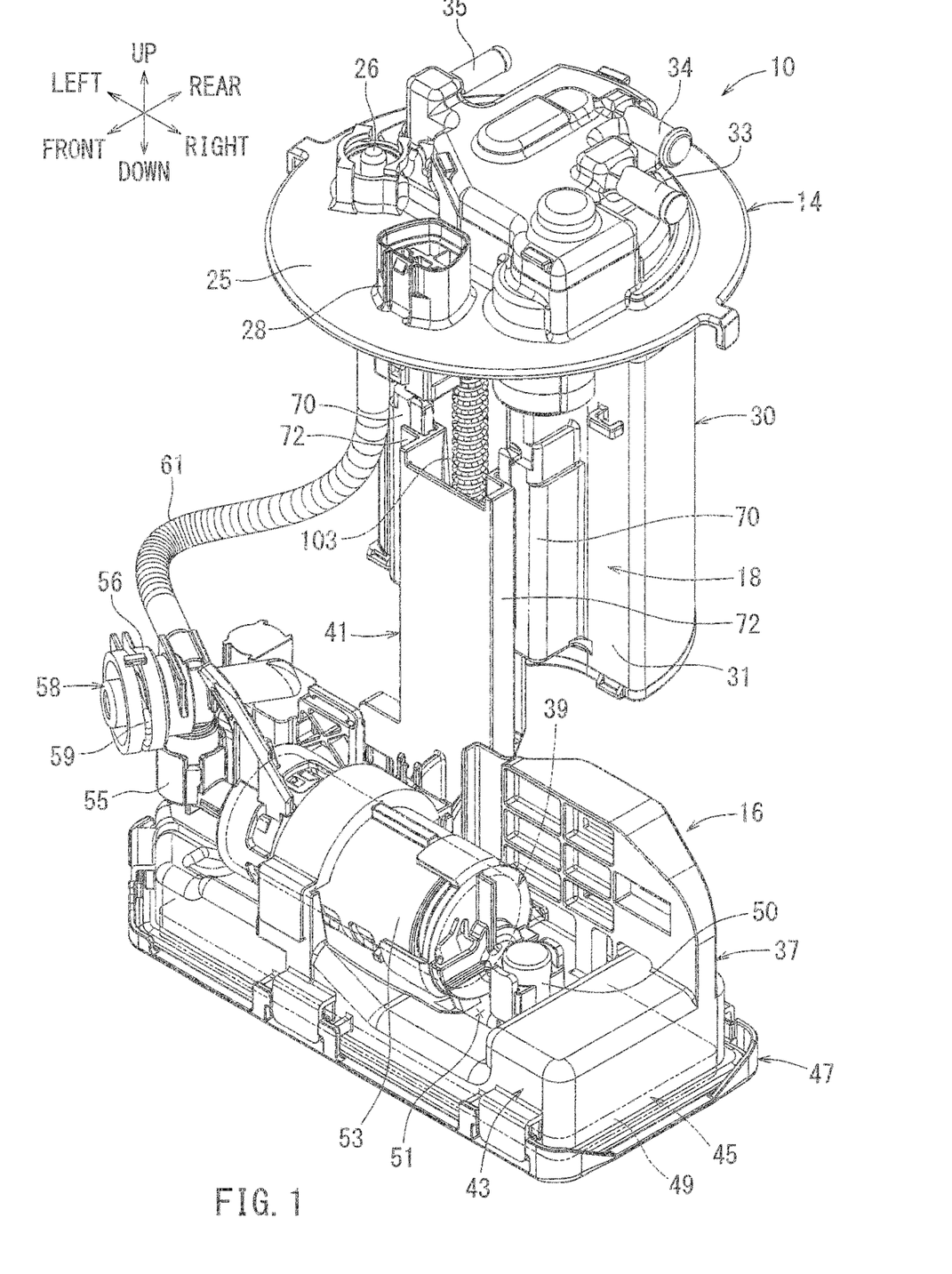
FIG. 1 is a perspective view of a fuel supply device according to one exemplary embodiment.

A flange unit (cover-side unit) 14 is attached to the upper wall 20 of the fuel tank 12 to close the opening 23. The flange unit 14 is made of resin and includes a disc-like flange body (cover member) 25. As shown in FIG. 1, an outlet port 26 and an electric connector 28 are formed on the flange body 25. Although not shown, a fuel supply pipe, which may lead to the vehicle's engine, is connected to the outlet port 26 on the upper surface of the flange body 25. An external connecter from the electric supply of the vehicle may be connected to the electric connector 28 of the flange body 25 of the fuel supply device 10.

The flange body 25 is formed with a canister portion 30 having the shape of a hollow container. The canister portion 30 is arranged to be inserted into the opening 23 of the fuel tank 12 (see FIGS. 2 to 4). The outer contour of the canister portion 30 at its rear end on the lower surface of the flange main body 25 is formed in the shape of a semi-cylindrical shape that is concentric with the disc shape of the flange body 25. The canister portion 30 includes a front wall 31 that is substantially planar in the left-to-right and up-to-down directions, perpendicular to and facing the frontward direction. Although not shown, adsorbents (for example, activated carbon) capable of adsorbing and desorbing evaporated fuel generated in the fuel tank 12 are stored in the canister portion 30.

An evaporation port 33 communicating with the interior of the canister portion 30, an atmospheric air port 34, and a purge port 35 are formed on an upper surface of the flange main body 25. The evaporation port 33 serves to introduce fuel vapor discharged from a breather pipe (not shown) connected to the fuel tank 12 from the exterior of the tank 12 into the canister portion 30. The atmospheric port 34 serves as a vent, and introduces air from the atmosphere into the canister portion 30 when the fuel vapor adsorbed by the adsorbents of the canister portion 30 is released. The purge port 35 serves to discharge the fuel vapor adsorbed by the adsorbents of the canister portion 30 to an intake passage of an engine.

As shown in FIGS. 2 and 3, the pump unit 16 is placed on the bottom wall 21 within the fuel tank 12, flush against the wall in a horizontal state (laterally placed such that its longitudinal length lies in the left-to-right direction) in which the vertical length of the pump unit 16 in the up-to-down direction is at its shortest. The pump unit 16 includes a sub-tank 37, a fuel pump 39, and a joint member 41.

The sub-tank 37 includes a tank main body 43, a fuel filter 45, and a bottom surface cover 47. The tank main body 43 is made of resin and is formed as a box-shape with an opening at its lower lateral base (herein after referred to as a "lower surface opening", describing the lower basal plane of the tank in the left-to-right and front-to-rear directions, as seen in FIGS. 2 and 3). The tank main body 43 has a rectangular shape elongated longitudinally in the rightward/leftward direction as seem from a plan view. An opening hole 51 is formed in the upper surface of the tank main body 43. The opening hole 51 functions to introduce fuel from within the fuel tank 12 into the sub-tank 37 (see FIG. 1).

The fuel filter 45 includes a filter member 49. The filter member 49 is made of resin non-woven fabric or the like and is formed in the shape of a hollow bag with a rectangular shape elongated longitudinally in the rightward/leftward direction as seen from a plan view so as to have a constant height in the upward/downward direction. The filter member 49 is arranged so as to close the lower opening of the tank main body 43. The upper surface of the filter member 49 faces the internal space of the tank main body 43. Therefore, the fuel introduced into the sub-tank 37 is stored in the fuel storage space formed between the tank main body 43 and the filter member 49.

An inner skeleton member (not shown) made of resin is placed within the filter member 49 to provide rigidity and maintain the filter member 49 in an expanded state. Although not shown, a connecting pipe made of resin is provided at the upper surface of the filter member 49 to facilitate communication between the inside and the outside of the filter member 49. The connecting pipe and the inner skeleton member are coupled by a snap-fit engagement or the like. The connecting pipe is arranged in the opening hole 51 of the tank main body 43 (see FIG. 1).

The bottom surface cover 47 is made of resin and formed in a mesh pattern allowing fuel to flow therethrough. The bottom surface cover 47 is coupled to the tank main body 48 by a snap-fit engagement or the like. As shown in FIGS. 2 and 3, the outer peripheral edge of the filter member 49 is held between the tank main body 43 and the bottom surface cover 47. Accordingly, even when the bottom surface cover 47 contacts the bottom wall 21 of the fuel tank 12 such that it is flush against said wall, the fuel within the fuel tank 12 can be sucked up from the lower surface of the filter member 49 into the filter member 49.

The fuel pump 39 is an electric fuel pump that serves to suck and discharge fuel. The outer contour of the fuel pump 39 is formed in a substantially cylindrical shape oriented longitudinally in the left-to-right direction. The fuel pump 39 is accommodated in a pump casing 53 made of resin. The pump casing 53 is coupled to the tank main body 43 of the sub-tank 37 by a snap-fit engagement or the like, forming a semi-circular arc fitting flush against the upper half of the fuel pump.

A fuel inlet port (not shown) provided at the right peripheral end of the fuel pump 39 in the longitudinal axial direction is connected to the connecting pipe of the fuel filter 45 present in hole 51 via the intake pipe portion 50 (see FIG. 1) formed on the right end of the pump casing 53. As a result of fluid communication between the connecting pipe and the intake pipe portion 50, the fuel filtered by the filter member 49 is sucked into the fuel pump 39. More specifically, the filter member 49 serves to filter both the fuel within the fuel tank 12 sucked from the lower surface of the fuel filter member 49 through the mesh of cover 47 into the fuel pump 39 as well as the fuel within the tank main body 43 of the sub-tank 37 sucked from the upper surface of filter member 49, through the filter member 49, and into the fuel pump 39. Since the filter member 49 is elongated in the rightward/leftward direction, the filtering surface area can be adjustably increased and the amount of intake air entering per unit of surface area into the filter member 49 that may be caused when a vehicle makes a turn can be consequently reduced.

As shown in FIG. 1, a fuel outlet port (not shown) provided at the left peripheral end the fuel pump 39, along its longitudinal axis, is connected to the outlet pipe portion 55 formed at the left end portion of the pump casing 53. A case portion 56 for a pressure regulator is formed in the middle of the outlet pipe portion 55, perpendicular to the up-to-down axis at the radial center of the outlet pipe portion 55. A pressure regulator 58 is fitted in the case portion 56 and a retaining member 59 for preventing the pressure regulator 58 from being removed is attached to the case portion 56 utilizing elastic deformation. The pressure regulator 58 serves to discharge surplus fuel into the fuel tank 12 while regulating the fuel pressure in the outlet pipe portion 55.

The outlet port 26 of the flange unit 14 and the outlet pipe portion 55 of the pump casing 53 are connected through the piping member 61 such as a bellow hose having a substantial degree of flexibility. Although not shown, an electric connector on the side of the pump unit 16 is connected to the electric connector 28 of the flange unit 14. The electric connector on the side of the pump unit 16 is also electrically connected to the fuel pump 39 via a wiring member having a flexibility, and thus the electricity provided to electric connector 28 can be used to supply fuel pump 39 via the electric connector on the side of the pump unit 16.

Figure 4:
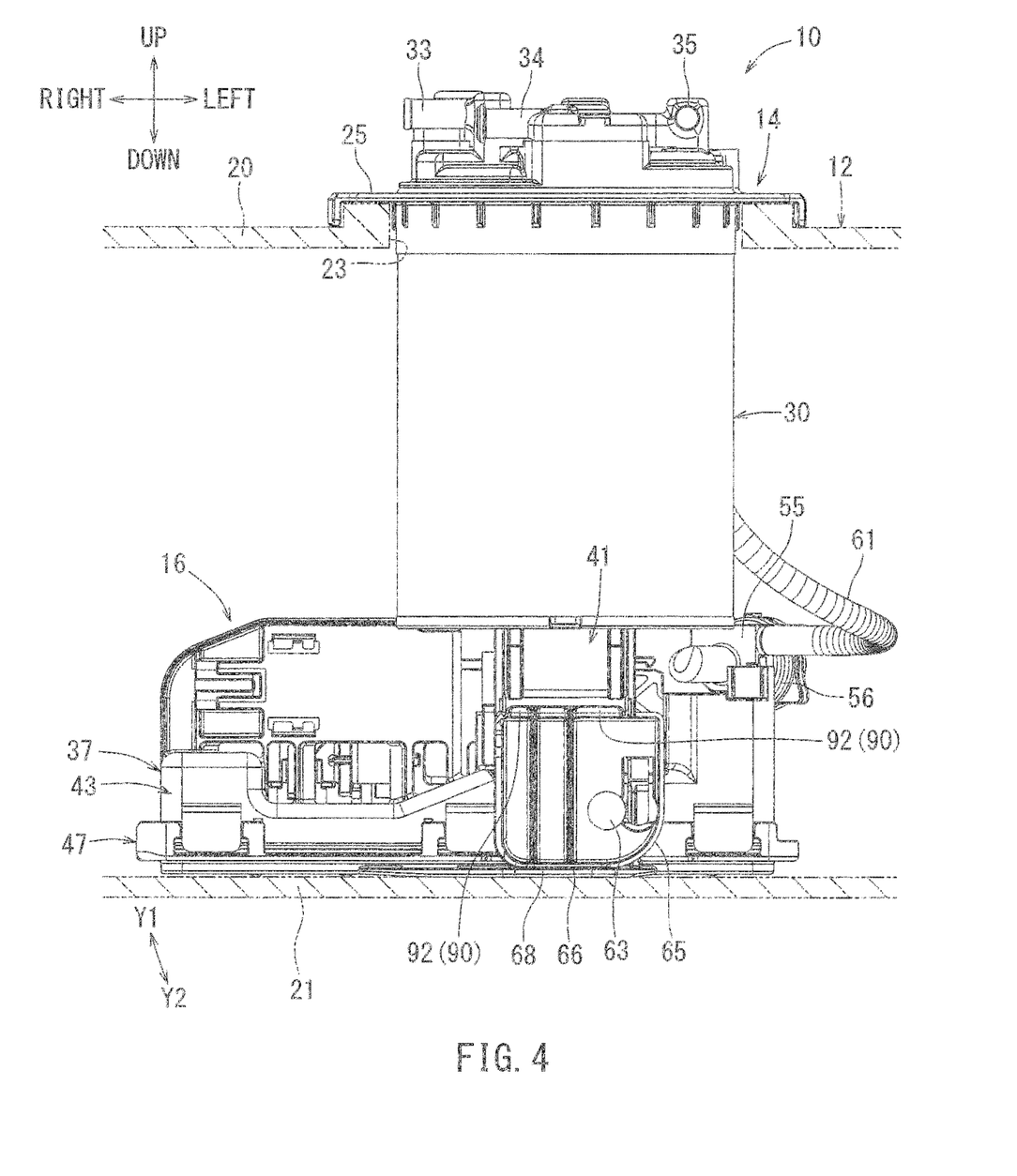
FIG. 4 is a rear view of the fuel supply device.

The joint member (joint portion) 41 is made of resin and is formed into a vertically elongated strip shape that is flat in the frontward/rearward and upward/downward directional plane, as well as the left/right and upward/downward directional plane, extending in the upward/rearward direction. As shown in FIG. 4, the lower end of the joint member 41 is rotatably connected to the rear side of the tank main body 43 for the sub-tank 37 via a support shaft 63. Accordingly, the sub-tank 37 and the joint member 41 are rotatably connected about an axis extending in the frontward/rearward direction.

A peripheral surface 65 partially forming a circular arc portion concentric with the support shaft 63 is formed at the corner defined by the lower end face and the left side (right side as shown in the rear view of FIG. 4) of the joint member 41. The lower surface of the right portion (left portion as shown in the rear view of FIG. 4) of the joint member 41 is formed with an anti-rotation surface 66 that is a flat surface, continuous with the circular arc face 65, that lies flush against the bottom of the fuel tank 21. The central area (in the left-to-right direction) at the rear side of the bottom surface cover 47 of the sub-tank 37 and overlapping with joint member 41 is also formed with a planar anti-rotation part 68 in the left/right frontward/rearward directional plane. The anti-rotation part 68 abuts the bottom wall 21 of the fuel tank 12 in a surface contacting manner, flush against the bottom of the fuel tank 21. The anti-rotation part 68 also abuts the anti-rotation face 66 of the joint member 41 as the sub-tank 37 is in a horizontal state flush against the wall adjacent to the joint member 41 at its central (in the left-to-right direction) rear portion (see FIGS. 1 and 3). In this way, with the provided anti-rotational surfaces increasing the friction between the sub-tank 37 and joint member 41, and the bottom wall 21 of the fuel tank 12, respectively, the sub-tank 37 and the pump 16 are restricted from rotating clockwise about shaft 63 as shown in FIG. 4, in the direction of Y1, in which the right end (left end as shown in the rear view of FIG. 4) of the sub-tank 37 would upon rotation obliquely ascend from the horizontal state (in a direction indicated by an arrow Y1 in FIG. 4). This state corresponds to the horizontal state of the pump unit 16 (pump side unit).

Since the joint member 41 is formed with the circular arc face 65 with no applied anti-rotational surface, the sub-tank 37 is allowed to rotate in a counterclockwise direction about support shaft 63 from the horizontal state to a suspended state as the right end of the sub-tank 37 (left end as shown in the rear view of FIG. 4) descends due to its own weight when the sub-tank 37 is suspended from the joint member 41.

Figure 7:
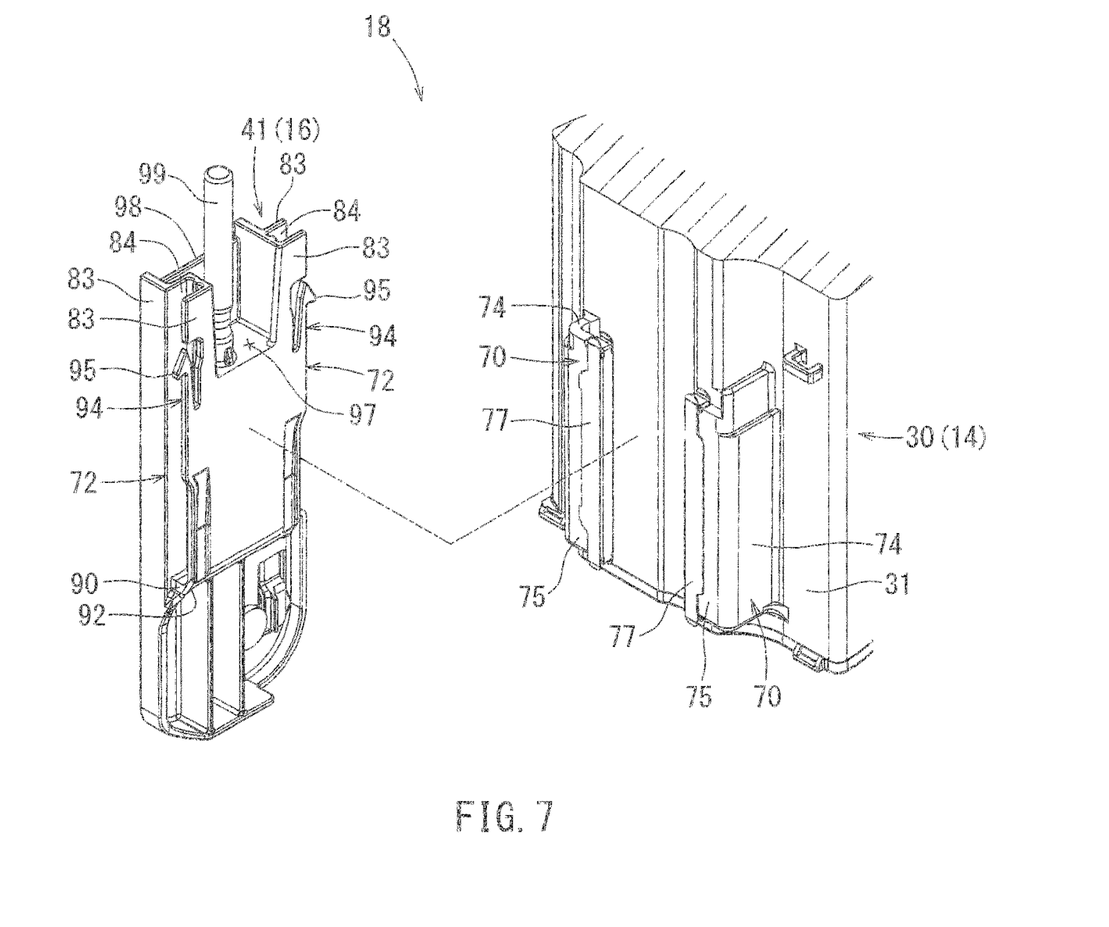
FIG. 7 is an exploded perspective view of the coupling mechanism of FIG. 1.

The coupling mechanism 18 will herein be described. As shown in FIG. 7, the coupling mechanism 18 includes a pair of right and left fixed-side rail members 70 provided at the front edge of the canister portion 30 of the flange unit 14, and a pair of right and left movable-side rail members 72 provided on the joint member 41 of the pump unit 16. The two fixed-side rail members 70 are integrally formed on the front surface of the front wall 31 of the canister portion 30, and further, the two fixed-side rail members 70 are formed to have a symmetrical appearance with respect to each other about the up-to-down axis at the central region (in the left-to-right direction) of front wall 31. Both of the fixed-side rail members 70 extend linearly in the upward/downward direction. The two fixed-side rail members 70 form an L-shape in the left/right and frontward/rearward planar cross-sectional view at their respective upper portions, and both include base portions 74 extending forward from the front wall 31 and rail portions 75 projecting inward in the left-to-right direction from the forward end of the base portions 74 toward the other respective rail portion 75 (see FIG. 5).

Figure 5:
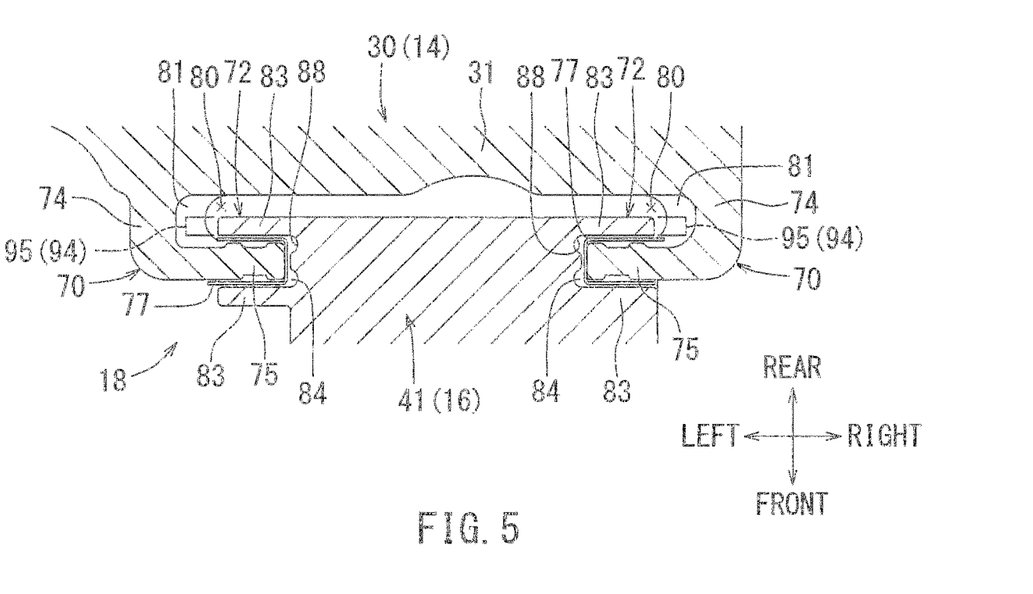
FIG. 5 is a horizontal cross sectional view of the coupling mechanism of FIG. 1.
Figure 6:
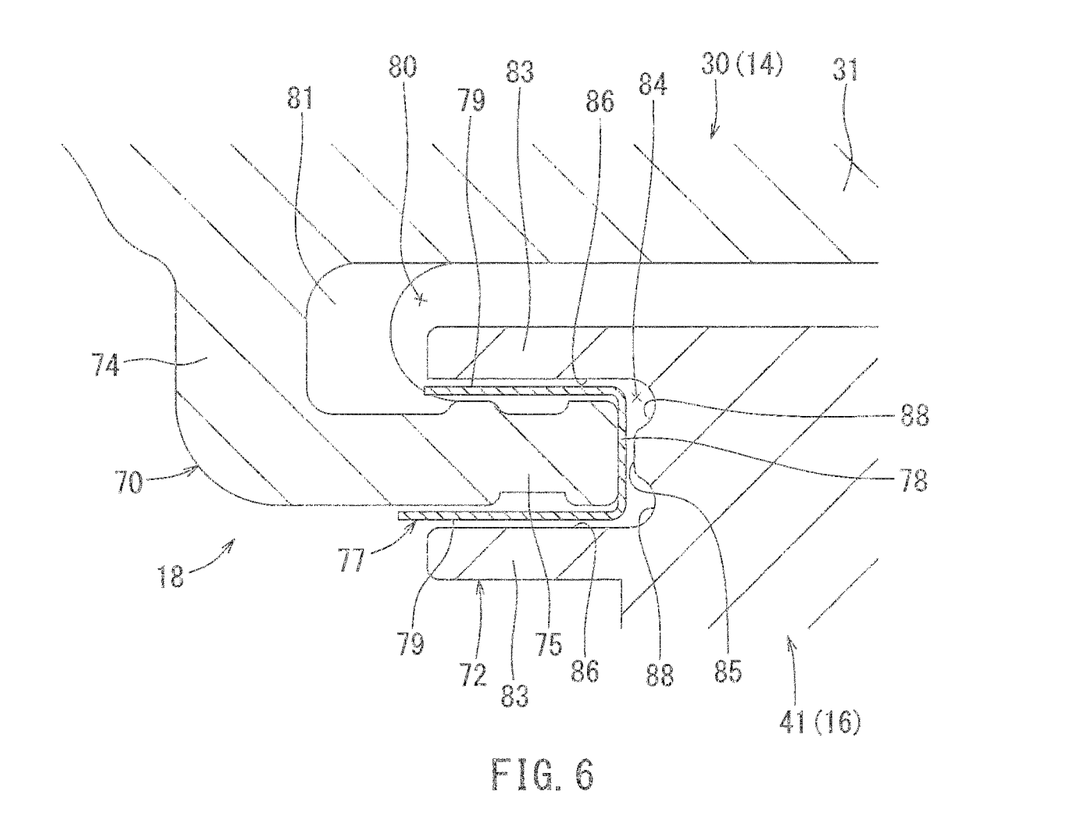
FIG. 6 is a horizontal cross sectional view of a part of the coupling mechanism of FIG. 1.

Retainers 77 are attached to both inward ends of the rail portions 75 to cover the respective inward ends of rail portions 75. The retainers 77 are formed of a metal plate such as, for example, a stainless steel plate. As shown in FIG. 6, the retainers (sliders) 77 are formed into a bracket-line channel shape in a left/right and frontward/rearward cross sectional view, and include an end plate portion 78 flush against the inward most end in the left-to-right direction of each rail portion 75 proximal the other rail portion 75. The end plate portion 78 extends in the front-to-rear direction as shown in FIGS. 5 to 6. The retainers 77 also each include two side plate portions 79 facing both left-to-right sides of the rail portions 75 at the front and rear ends of corresponding rail portion 75. Stoppers 81 are formed at the rear portions at the lower ends of the groove portions 80 (the rear portions are located at the back surface of the page of FIG. 5) wherein the groove portions 80 are formed by the space between the front wall 31 of the canister portion 30 and both fixed-side rail members 70 (see FIG. 2).

As shown in FIG. 7, both movable-side rail members 72 are integrally formed on both right and left sides of the joint member 41, and are formed to have a symmetrical appearance with respect to each other about the up-to-down axis at the central region (in the left-to-right direction) of the joint 41. Both of the movable-side rail members 72 linearly extend in the upward/downward direction. Both of the movable-side rail members 72 include a pair of front and rear walls 83, in the left/right and upward/downward directional plane, and the frontward/rearward and upward/downward directional plane, respectively, and a channel-groove shaped rail groove 84 is formed between both of the walls 83. More specifically, as shown in FIG. 6, the rail groove 84 is defined by an inner end face 85 in the frontward/rearward and upward/downward directional plane, and a pair of groove lateral faces 86 in the left/right and upward/downward directional planes, respectively. Both of the rail grooves 84 face each other oppositely in the front-to-rear direction (FIG. 5).

As shown in FIG. 6, recesses 88 having a semi-circular cross section in the left/right and frontward/rearward cross-sectional view, for relieving the concentration of the stress, are formed at both corners defined by the intersection of inner end face 85 and both groove lateral faces 86 of the rail grooves 84 of the movable-side rail member 72. The recesses 88 extend along the corners of the rail grooves 84 in the upward/downward direction (in the direction going into and out of the page of FIG. 6). Both of the recesses 88 are formed as semi-circular indentations into the inner end face 85 at the corners of the corresponding rail groove 84. Both of the recesses 88 are recessed in a direction further inward and further away from the rail portion 75 of the fixed-side rail member 70 generally towards the other rail portion 75.

As shown in FIG. 5, the rail grooves 84 formed on both of the movable-side rail members 72 of the joint member 41 are movably and slidably engaged in an upward/downward direction (in the direction going into and out of the page of FIG. 5) with respect to the rail portions 75 (i.e., retainers 77 on rail portions 75) of both of the fixed-side rail members 70. In this way, the joint member 41 is slidably connected to the flange unit 14 in the upward/downward direction.

As shown in FIG. 7, a stopper 90 is formed at the lower end of the both movable-side rail members 72 to close the lower end opening of the rail groove 84. The lower surfaces of the stoppers 90 are formed with inclined surfaces 92 inclined downwardly from the rear end toward the front (see FIGS. 4 and 7).

Upper portions of side walls 83 that are located at the rear side of the joint member 41 are provided with a pair of right and left resilient locking pieces 94 that are formed to be symmetrical with respect to each other and are formed to be resiliently deformable in opposite directions. Locking claws 95 are formed at the uppermost end of the resilient locking pieces 94. The locking claws 95 of the resilient locking pieces 94, biased outward but deformable inward in the left-to-right direction, are engaged within the groove portions 80 of the canister portion 30 so as to stride over the stoppers 81 utilizing the resilient deformation of the resilient locking pieces 94 when the joint member 41 is engaged from downward to the fixed-side rail members 70 (see FIG. 2 and dashed-and-double-dotted lines 95 in FIG. 5). When the joint member 41 is suspended from the flange unit 14 upon the flange unit 14 being mounted to the upper wall 20 of the fuel tank 12, the locking claws 95 of the resilient locking pieces 94 engage the stoppers 81 of the groove portions 80 of the canister portion 30, thereby preventing the movable-side rail members 72 from being removed from the fixed-side rail members 70.

As shown in FIG. 7, a recess 97 formed as a U-shaped groove in the left/right and upward/downward directional plane extending throughout the front-to-rear direction, is formed in the center of the upper face of the joint member 41. A hollow cylindrical guide column 99 is formed upright on the upper surface of the base of the groove formed by the recess 97. A front opening of the recess 97 is closed by the front plate portion 98 of the joint member 41.

As shown in FIG. 2, a cylindrical guide tube portion 101 with a top is formed so as to be suspended from the lower surface of the flange main body 25 of the flange unit 14. A spring (biasing member) 103 such as a coil spring is interleaved between the flange unit 14 and the joint member 41. The lower part of the spring 103 is fitted onto the guide column 99. The upper end of the spring 103 is inserted into the guide tube portion 101. The spring 103 biases the joint member 41 downwardly with respect to the flange unit 14. Thereby, the pump unit 16 is resiliently pressed flush against on the bottom wall 21 of the fuel tank 12, and thus, lies in its horizontal state as described above.

Hereinafter, the operation of the fuel supply device 10 will be described 10. When the fuel pump 39 is driven by the external drive power provided through electric connector 28 as described above, both fuel within the fuel tank 12 and within the sub-tank 37 will be sucked by the fuel pump 39 through the fuel filter 45 and pressurized. The fuel is supplied to an engine of the vehicle from the outlet port 26 of the flange unit 14 after the fuel pressure is regulated by the pressure regulator 58 and discharged into the piping member 61.

Hereinafter, assembly of the fuel supply device 10 on the fuel tank 12 will be described. The fuel supply device 10 is initially in an extended state when assembled to the fuel tank 12. More specifically, the pump unit 16 is in a suspended state with respect to the flange unit 14. In this state, the locking claws 95 of the resilient locking pieces 94 of joint member 41 engage with the stoppers 81 in the grooves 80 of the fixed-side rail members 70 as the joint member 41 slides downwardly with respect to the flange unit 14. Subsequently, the sub-tank 37 is rotated counter-clockwise about the support shaft 63 from the horizontal state (see an arrow Y2 in FIG. 4) relative to the joint member 41 to be brought into an inclined state.

Subsequently, the fuel supply device 10 in an extended state is lowered from a lower end side of the sub-tank 37 leading first, and is inserted into the opening 23 of the fuel tank 12 from above the opening 23. The sub-tank 37 is rotates clockwise about the support shaft into a horizontal state relative to the joint member 41 in the fuel tank 12, and is placed flush against the bottom wall 21 of the fuel tank 12. At this time, the anti-rotation surface 66 of the joint member 41 abuts the anti-rotation portion 68 of the bottom surface cover 47 of the sub-tank 37 in the front-to-rear direction. In this way, rotation in the direction of Y1 is prevented as described above, and the sub-tank 37 may be maintained in a horizontal state.

During insertion of the fuel supply device 10 into the fuel tank 12 occurs, the flange unit 14 is pressed down against the biasing force of the spring 103 while the flange unit 14 is concentrically positioned above the opening 23 of the fuel tank 12. To counter the upwards biasing force of the spring, the flange unit 14 is fixed to the upper wall 20 via a fixing fitting or a fixing means (not shown) such as a bolt while being fitted to the opening 23 in the upper wall 20 of the fuel tank 12. As a result, the opening 23 of the fuel tank 23 is closed and the pump unit 16 is maintained in a pressed state against the bottom wall 21 of the fuel tank 12 due to the biasing force of the spring 103. In this state, the stopper 90 of the joint member 41 is located in a position at a predetermined distance spaced downward from the both fixed-side rail members 70 of the flange unit 14 (see FIG. 3).

The assembly of the fuel supply device 10 to the fuel tank 12 is completed as described-above (see FIG. 2 to FIG. 4). This state is an installed state of the fuel supply device 10. The fuel tank 12 may be deformed, i.e. expanded and contracted due to the variation of internal pressure within the tank which may be caused by a variation of the temperature or the amount of fuel within the tank. In accordance with this change, the height of the fuel tank 12, i.e. the distance between the upper wall 20 and the bottom wall 21 varies (increased or reduced). In this case, the flange unit 14 and pump unit 16 are able to relatively move in the upward/downward direction via the sliding motion of the coupling mechanism 18 between the flange unit 14 and the joint member 41 so that both units 14, 16 may follow the change of height of the fuel tank 12. Therefore, the pump unit 16 (more specifically, sub-tank 37) can be maintained in the pressed state against the bottom wall 21 of the fuel tank 12 due to the biasing force of the spring 103.

Figure 8:
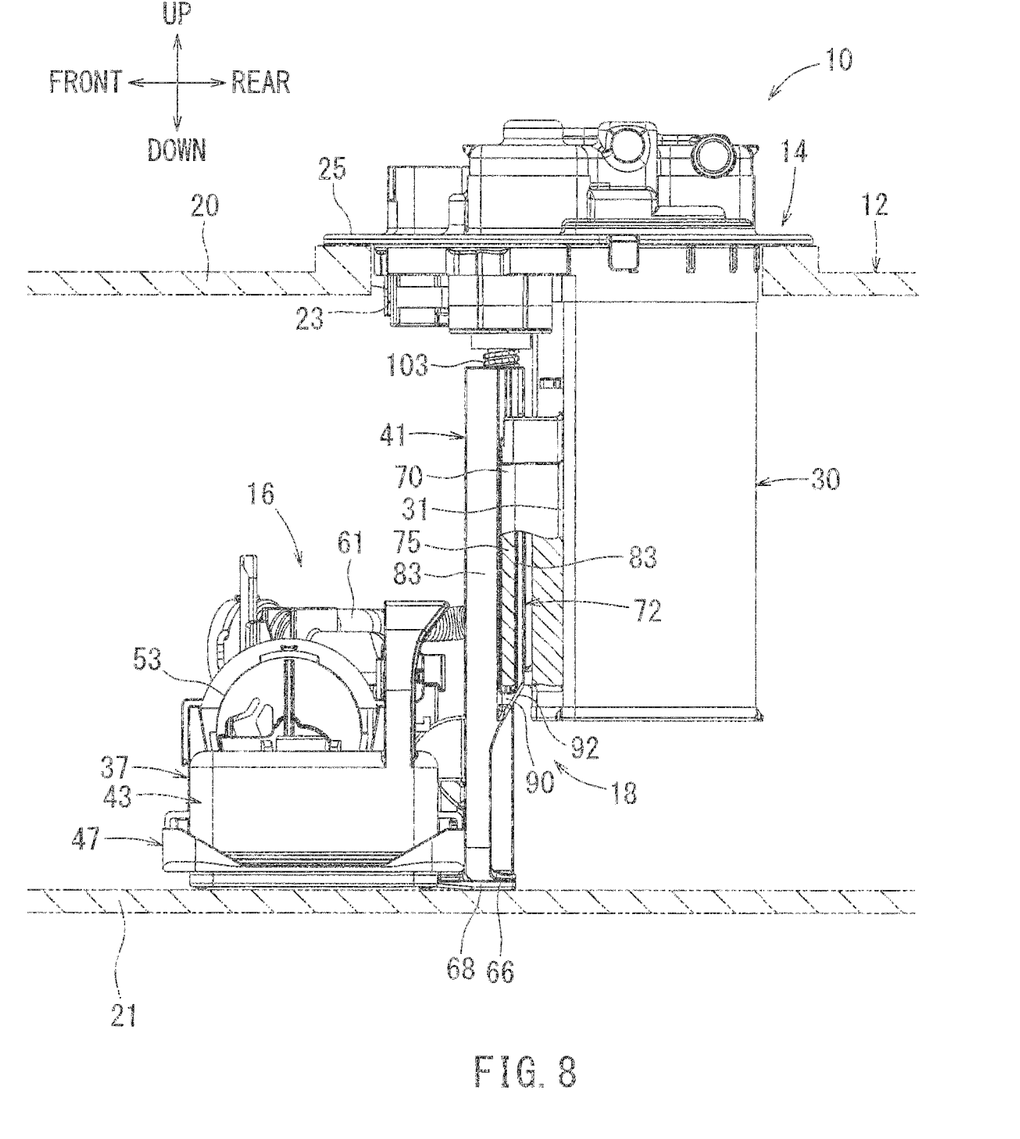
FIG. 8 is a side view of the fuel supply device of FIG. 1 in a minimum height state.

Incidentally, when the fuel tank 12 undergoes an excessive contracting force, both movable-side rail members 72 of the joint member 41 may ascend relative to the rail portions 75 of fixed-side rail members 70 of the flange unit 14 and the stoppers 90 may finally abut the lower ends of the rail portions 75 (see FIG. 8). This configuration may restrict the movable-side rail members 72 from moving excessively upward with respect to the rail portions 75 of the fixed-side rail members 70 thereby the fuel supply device 10 prevents an excessive contraction of the fuel tank, and the fuel supply device 10 is maintained at a minimum height.

At least one of the stoppers 90 of the movable-side rail members 72 may get caught by the opening edge around the opening 23 when the pump unit 16 is inserted into the fuel tank 12 while the joint member 41 is shifted at the rear side with respect to the opening edge around the opening 23 of the fuel tank 12. To prevent this from occurring, inclined surfaces 92 are formed on the lower surfaces of the stoppers 90. This tapered and inclined configuration prevents the stoppers 90 from being caught by the opening edge around the opening 23 because the inclined surfaces 93 abut and slide on the opening edge around the opening 23.

According to the above-described fuel supply device 10, the recesses 88 having a semi-circular cross-section for relieving stress concentrations are formed at both corners of the rail grooves 84 in both movable-side rail members 72 of the coupling mechanism 18 (see FIG. 6). Therefore, it is possible to relieve the concentration of the stress at both corners of the rail grooves 84 in the movable-side rail members 72 in the event of a vehicle collision. Further, the presence of said recesses 88 can prevent damage such as cracks at both corners due to the stress concentration. Further, since the recesses 88 are formed at both corners of the rail grooves 84 on both of the movable-side rail members 72, the interference of the recesses 88 with respect to the rail portions 75 of the fixed-side rail members 70 can be avoided unlike the case where the radius of curvature of the chamfered portions at the corners is increased. This configuration may relieve the concentration of the stress at the both corners of the rail grooves 84 in the both movable-side rail members 72 while avoiding interference with the rail portions 75 of the both fixed-side rail members 70. Further, it is also advantageous in cost since it is only necessary to modify the design on the both movable-side rail members 72 without requiring the design modification of the both fixed-side rail members 70.

Both of the recesses 88 are formed at the inner end face 85 at the corners of the rail grooves 84 and are recessed in a direction inward relative to the rail portions 75 of the fixed-side rail members 70 in the left-to-right direction towards the other rail portion 75. With this structure, the stress concentrations at the corners of the rail grooves 84 can be prevented while the strength of both side walls 83 that define the both groove lateral faces 86 of the rail grooves 84 may be maintained. For example, if both of the recesses 88 were to be formed at both of the groove lateral faces 86 at the corners of the rail grooves 84, such that the recesses 88 were indenting into the lateral faces 86 in the up/down directions, both of the side walls 83 may not be as rigid and would be easily deformable due to the reduction of the strength in accordance with the reduction of the thickness of the both side walls 83. In contrast, in the present embodiment, both of the recesses 88 are formed at the inner end faces 85 at the corners of the rail grooves 84, inward only in terms of the left-to-right and not the front/rear directions, thereby facilitating the reduction of stress concentrations at both corners of the rail grooves 84 while maintaining the strength of the side walls 83.

The slidability between the rail members 70, 72 is enhanced by the presence of the metal retainers 77 interposed between the rail portions 75 of the both fixed-side rail members 70 and the rail grooves 84 in the both movable-side rail members 72 of the coupling mechanism 18 (see FIG. 6). Therefore, it is possible to prevent the generation of abnormal noise caused by direct sliding contact of resin of the both rail members 70, 72.

The excessive upward movement of the both movable-side rail members 72 with respect to the rail portions 75 of the both fixed-side rail members 70 can be prevented by the stoppers 90 formed at the lower ends of the rail grooves 84 of both movable-side rail members 72 for the coupling mechanism 18 (see FIG. 8). Therefore, it is possible to prevent excessive upward movement of the pump unit 16 when the fuel tank 12 contracts due to the variation of the internal pressure of the tank, and therefore it is possible to maintain the fuel supply device 10 at a minimum height and prevent further excessive contraction of the fuel tank 12.

The inclined surfaces 92 that are formed at the stoppers 90 of the both movable-side rail members 72 for the coupling mechanism 18 may prevent the stoppers 90 from being caught by the opening edge of the opening 23 when the pump unit 16 is inserted into the fuel tank 12 due to their tapered and inclined configuration. This configuration allows the joint member 41 of the pump unit 16 to be smoothly inserted into the fuel tank 12.

The exemplary embodiments of the present invention are not limited to vehicles such as an automobile but may be applied to a fuel supply device for the other vehicles. Further, the number of components provided for each of the units 14, 16 of the fuel supply device 10 may be appropriately increased or reduced and/or the components may be modified. Further, the joint member 41 may be fixed to a fixing member such as the pump casing 53 or the tank main body 43 of the sub-tank 37, or may be formed at the pump casing 53 or the tank main body 43 of the sub-tank 37 as a joint portion. The numbers of combinations comprising the fixed-side rail member 70 and the movable-side rail member 72 is not limited to two on the right and left but may be one or there or more. The recesses 88 at the rail grooves 84 in the movable-side rail members 72 may be formed at one corner of both corners in the rail grooves 84. The rail grooves may be provided at the fixed-side rail members 70 while the rail portions 75 may be provided at the movable-side rail members 72.

The various exemplary embodiments described above in detail with reference to the accompanying drawings are intended to be representative of the present invention and thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide improved fuel supply device and/or methods of making and using the same.

The invention claimed is:

1. A fuel supply device, comprising:
a cover-side unit configured to close an opening in an upper wall of a fuel tank of a vehicle;
a pump-side unit including a fuel pump configured to be inserted through the opening and disposed within the fuel tank; and
a coupling mechanism moveably coupling the pump-side unit to the cover-side unit in a vertically slidable manner;
wherein the coupling mechanism comprises:
a fixed-side rail member provided at the cover-side unit and including a rail portion; and
a movable-side rail member provided at the pump-side unit and including a rail groove that slidably engages the rail portion of the fixed-side rail member, and
wherein a recess with a semi-circular cross section is formed at a corner of the rail groove of the movable-side rail member, wherein the recess is configured to reduce stress concentrations at the corner.

2. The fuel supply device of claim 1, wherein the rail groove of the movable-side rail member includes an inner end face and two lateral faces oriented perpendicular to the inner end face; and
wherein the recess is formed at the inner end face at the corner of the rail groove, and wherein the recess extends in a direction away from the rail portion of the fixed-side rail member.

3. The fuel supply device of claim 1, further comprising a metallic slider positioned between the rail portion of the fixed-side rail member and the rail groove of the movable-side rail member.

4. The fuel supply device of claim 1, further comprising a stopper at a lower end of the rail groove of the movable-side rail member, wherein the stopper is configured to limit upward movement of the movable-side rail member with respect to the rail portion of the fixed-side rail member.

5. The fuel supply device of claim 4, wherein the stopper includes an inclined surface configured to prevent the stopper from being caught on an edge of the opening of the fuel tank upon insertion into the fuel tank.

6. A fuel supply device comprising:
a cover-side unit configured to close an opening in an upper wall of a fuel tank of a vehicle, wherein the cover-side unit comprises a disc-shaped cover extending over a larger surface area than the opening;
a pump-side unit comprising a fuel pump configured to be inserted through the opening and disposed within the fuel tank, wherein the pump-side unit includes a vertically extending flange biased upwards by a spring and rotatable about a support shaft connecting the flange in a perpendicular manner to said pump-side unit; and
a coupling mechanism moveably coupling the pump-side unit to the cover-side unit in a vertically slidable manner;
wherein the coupling mechanism comprises:
a pair of fixed-side rail members provided at the cover-side unit, wherein each fixed-side rail members includes a perpendicularly extending rail portion; and
a pair of movable-side rail members provided as part of the vertically extending flange of the pump-side unit, wherein the flange includes a pair of rail grooves shaped in the form of a channel groove, where each rail groove slidably engages with one of the rail portions of the fixed-side rail member.

7. The fuel supply device of claim 6, wherein the pair of fixed-side rail members are disposed at a front edge of a canister, wherein the canister is coupled to and suspended from the disc cover member.

8. The fuel supply device of claim 6, wherein each fixed-rail side member extends in a front-rear and up-down directional plane, and the corresponding fixed rail portions extend inwardly from a front region of the fixed-rail side members in a left-right and up-down directional plane towards the other fixed-rail side member to form a groove therebetween.

9. The fuel supply device of claim 6, wherein a lower portion of the vertically extending flange comprises a partial circular arc surface that contacts an anti-rotation part of the pump-side unit.

10. The fuel supply device of claim 9, wherein the partial circular arc surface is concentric with the support shaft.

11. The fuel supply device of claim 9, wherein a bottom surface of the pump-side unit comprises a planar surface configured to be placed flush against a bottom wall of the fuel tank.

12. The fuel supply device of claim 6, wherein the pump-side unit includes a bottom surface cover with a mesh configured to allow surrounding fuel within the fuel tank to flow therethrough when the pump-side unit is placed flush against a bottom wall of the fuel tank.

13. The fuel supply device of claim 6, wherein the spring of the pump-side unit is interposed between the disc-shaped cover and the vertically extending flange.

14. The fuel supply device of claim 6, further comprising a pressure regulator coupled to the pump-side unit and configured to regulate the pressure of fuel output from the pump-side unit.

15. The fuel supply device of claim 14, further comprising a bellow hose connected at a first end to the pressure regulator and at a second end to the disc-shaped cover, wherein the bellow hose is configured to supply pumped fuel to a vehicle engine.

16. A fuel supply device comprising:
a cover-side unit configured to close an opening formed in an upper wall of a fuel tank of a vehicle, wherein the cover-side unit includes a disc-shaped cover covering a larger surface area than the opening;
a pump-side unit including a fuel pump configured to be inserted through the opening and disposed within the fuel tank, wherein the pump-side unit includes a vertically extending flange biased upwards by a spring and rotatable about a shaft connecting the flange in a perpendicular manner to the pump-side unit; and
a coupling mechanism coupling the pump-side unit to the cover-side unit in a vertically slidable manner, wherein the coupling mechanism comprises:
a pair of fixed-side rail members, wherein each fixed-side rail member has a perpendicularly extending rail portion provided at the cover-side unit; and
a pair of movable-side rail members provided as part of the vertically extending flange of the pump-side unit, wherein flange has two rail grooves shaped in the form of a channel groove, wherein each rail groove slidably engages with one of the rail portions;
wherein a pair of recesses with semi-circular cross sections are formed at the corners of each rail groove of each movable-side rail member.

17. The fuel supply device of claim 16, wherein each recess forms the semi-circular cross section in the left-right and front-rear directional planes and extends vertically in the up-down direction.

18. The fuel supply device of claim 17, where the pair of recesses of each rail groove are recessed inwardly from the groove in the left-to-right direction towards the other rail groove.

19. The fuel supply device of claim 18, wherein the recesses are formed at the inner end of each rail groove in the left-to-right direction.

* * * * *